United States Patent
Schüle et al.

(10) Patent No.: US 8,166,839 B2
(45) Date of Patent: May 1, 2012

(54) SEAT ADJUSTER

(75) Inventors: Robert Schüle, Böblingen (DE); Hans Schmodde, Böblingen (DE); Clemens Lowinski, Hilden (DE)

(73) Assignee: Johnson Controls GmbH, Burscheid (DE)

( * ) Notice: Subject to any disclaimer, the term of this patent is extended or adjusted under 35 U.S.C. 154(b) by 70 days.

(21) Appl. No.: 11/659,561

(22) PCT Filed: Aug. 1, 2005

(86) PCT No.: PCT/EP2005/008308
§ 371 (c)(1),
(2), (4) Date: Nov. 1, 2007

(87) PCT Pub. No.: WO2006/015755
PCT Pub. Date: Feb. 16, 2006

(65) Prior Publication Data
US 2008/0197685 A1 Aug. 21, 2008

(30) Foreign Application Priority Data
Aug. 7, 2004 (DE) .......................... 10 2004 038 457

(51) Int. Cl.
*B60N 2/22* (2006.01)
(52) U.S. Cl. .................. 74/99 A; 74/107; 297/367 R
(58) Field of Classification Search .............. 74/49, 50, 74/53, 54, 55, 142, 143, 99 A, 107; 92/31, 92/138; 297/366, 367 R
See application file for complete search history.

(56) References Cited

U.S. PATENT DOCUMENTS

| | | | |
|---|---|---|---|
| 3,051,526 A | | 8/1962 | Werner et al. |
| 3,444,949 A | * | 5/1969 | Pollock .......................... 180/271 |
| 3,753,386 A | * | 8/1973 | Scott, Jr. ......................... 92/5 R |
| 3,999,247 A | | 12/1976 | Cremer |
| 4,339,960 A | * | 7/1982 | Senft ................................ 74/50 |
| 5,031,470 A | * | 7/1991 | Karlsson ........................... 74/50 |
| 6,367,342 B1 | * | 4/2002 | Weismann et al. ............. 74/335 |
| 6,945,131 B2 | * | 9/2005 | Dewert ............................ 74/25 |

FOREIGN PATENT DOCUMENTS

| | | |
|---|---|---|
| DE | 59 1 878 | 1/1934 |
| DE | 30 01 164 | 7/1981 |
| DE | 30 27 629 A1 | 2/1982 |
| DE | 32 31 352 C1 | 11/1983 |
| DE | 42 27 266 * | 5/1993 |
| DE | 198 45 698 A1 | 4/2000 |
| DE | 103 12 140 A1 | 10/2004 |

(Continued)

OTHER PUBLICATIONS

International Search Report for PCT/EP2005/008308; date of mailing Nov. 22, 2006; 2 pages.

*Primary Examiner* — William C Joyce
(74) *Attorney, Agent, or Firm* — Foley & Lardner LLP (57) ABSTRACT

A transmission device, in particular for the adjuster of a vehicle seat, is suitable for converting a linear driving motion into a rotary output motion. According to an exemplary embodiment, the device has at least one lever that extends radially relative to a driven axis and is connected thereto. The at least one lever has a free end that interacts with an inclined surface that is moveable in a substantially linear manner in the direction of a driven shaft.

20 Claims, 6 Drawing Sheets

FOREIGN PATENT DOCUMENTS

| | | |
|---|---|---|
| EP | 0 397 631 B1 | 11/1994 |
| EP | 0 639 729 A1 | 2/1995 |
| JP | 63-111359 | 5/1988 |
| JP | 4018408 | 1/1992 |
| JP | 11-255010 | 9/1999 |
| JP | 2002-098210 A | 4/2002 |
| JP | 2003-226168 | 8/2003 |
| JP | 2003-244856 | 8/2003 |

* cited by examiner

SEAT ADJUSTER

CROSS-REFERENCE TO RELATED PATENT APPLICATIONS

The present Application is a National Phase Application of PCT/EP2005/008308 entitled, "Transmission Device, in particular for the Seat Adjuster of a Motor Vehicle, and Ratchet-Type Adjuster for a Vehicle Seat" filed on Aug. 1, 2005 which published under PCT Article 21(2) on Feb. 16, 2006 as WO 2006/015755 A2 in the German language, which claims priority to German Patent Application DE 10 2004 038 457.6 filed Aug. 7, 2004, the entire disclosures of which, including their specifications and drawings, are expressly incorporated herein by reference.

BACKGROUND

The present disclosure relates generally to a transmission device for translating a linear driving motion into a rotary output motion. More particularly, the present disclosure relates to a transmission device for use with an adjuster of a vehicle seat, and to a ratchet-type seat adjuster equipped therewith.

A transmission device of the generic type for adjusting the inclination of the backrest of a vehicle seat is disclosed by the published patent application DE 30 01 164 A1. The disclosed transmission device comprises a simple lever mechanism by means of which the movement of a linearly acting piston of a hydraulic cylinder is translated into a rotary motion. The output torque in the disclosed transmission device remains substantially constant over the entire travel of the piston. Transmission devices of this type take up a considerable amount of space and are less suitable when torques of different magnitude and different rotational speeds are required during the course of the rotary motion.

To facilitate the release of a locking detent device (e.g., a ratchet-type seat adjuster, etc.), a high release torque is often required in order to rotate the locking components out of direct engagement. However, the same relatively high torque is often not necessary during adjustment of the locking detent device. Once the locking components are out of engagement, the components are to be rapidly brought into their release limit position, for which a high adjusting torque is no longer required.

Thus, there is a need to provide a transmission device of compact construction for translating a linear driving motion into a rotary output motion. Further still, there is a need to provide a transmission device for which the output torque and speed are to be easily adjustable over the course of the movement.

SUMMARY

One exemplary embodiment relates to a transmission device including at least one lever and an inclined face. The at least one lever extends radially to a driven axis and is connected thereto. The inclined face is movable in a substantially linear manner in the direction of the driven axis. A free end of the at least one lever interacts with the inclined face. The interaction causes the associated lever end to shift laterally. The lever supported on the driven axis thereby performs a swiveling motion, as a result of which the driven shaft performs a rotary motion.

The inclined face is designed so that at the point of action between the lever end and the inclined face the surface of the inclined face is inclined by an angle of between 0 degrees and 90 degrees to the direction of its displacement. A force exerted on the lever end by the wedging action and translated into a rotary motion by the rotational bearing of the lever (i.e., a force perpendicular to the displacement direction of the inclined face) is at its greatest magnitude when the angle of inclination of the inclined face is at its smallest angle. As such, with a small angle, a high torque is generated on the driving shaft at a low rotational speed. As the angle of inclination increases, the attainable torque will be lower and the rotational speed will be higher.

According to an exemplary embodiment, the action between the lever and the inclined face operates through sliding friction, especially under relatively low acting forces. This serves to minimize the number of components required. In the area of a point of action (i.e., the point where the lever contacts the inclined face), the lever and/or the inclined face may be produced from materials having a low coefficient of friction, such as polyoxymethylene (POM), for example.

According to another exemplary embodiment, the action between the lever and the inclined face operates through rolling friction. For such an embodiment, a roller supported at the lever end, for example, can be brought into contact with the inclined face. Such an embodiment lends itself to very high acting forces or a large inclination of the inclined face with a correspondingly rapid rotary motion of the driven axis.

The inclined face is inclined in relation to an imaginary straight line connecting the point of action and the driven axis of rotation and is displaced in the direction of this imaginary straight line or parallel thereto, it being possible to use a lever which extends in the direction of this imaginary straight line.

According to another exemplary embodiment, the inclined face is arched. For purposes of the present disclosure, the term "arched" is used broadly to refer to not only curved contours but also polygonal contours.

For many applications, including that of releasing vehicle seat ratchet-type adjusters, the inclination of the inclined face at the point of action increases as the distance of the inclined face from the driven axis in a lateral direction diminishes. With a uniform linear motion of the inclined face in the direction of the axis of rotation, the rotational speed of the driven shaft increases.

According to another exemplary embodiment, the transmission device comprises a plurality of levers, each interacting with a separate inclined face, so that the torque that can be generated on the driven shaft can be increased, virtually arbitrarily, as a function of the number of linear drives. In such an embodiment, the bearing forces of the driven shaft caused by the acting forces may balance themselves out, so that its bearing can be of comparatively simple design. These advantages accrue, for example, when two levers are provided (e.g., two levers that are diametrically opposite one another, etc.). Such a transmission device can be accommodated in a slender housing.

According to another exemplary embodiment, the inclined faces are part of a link guide, moveable in the direction of the driven axis of rotation and counter thereto, so that both the linear motion of the inclined face towards the axis of rotation and the opposing linear motion can be used to generate an alternating torque.

According to another exemplary embodiment, the transmission device is designed to be used in ratchet-type adjusters for vehicle seats, particularly for adjusting the inclination of the backrest, the output of the transmission device acting on a latch and/or a locking cam of the ratchet-type adjuster. To release the latch and/or the locking cam securing the latch in the retained position, high release forces are usually necessary. Once the direct contact of the locking teeth is cancelled, however, the latch and/or the locking cam can be shifted with little effort, but rapidly, into the unlocking limit position.

DETAILED DESCRIPTION

Figure 1:
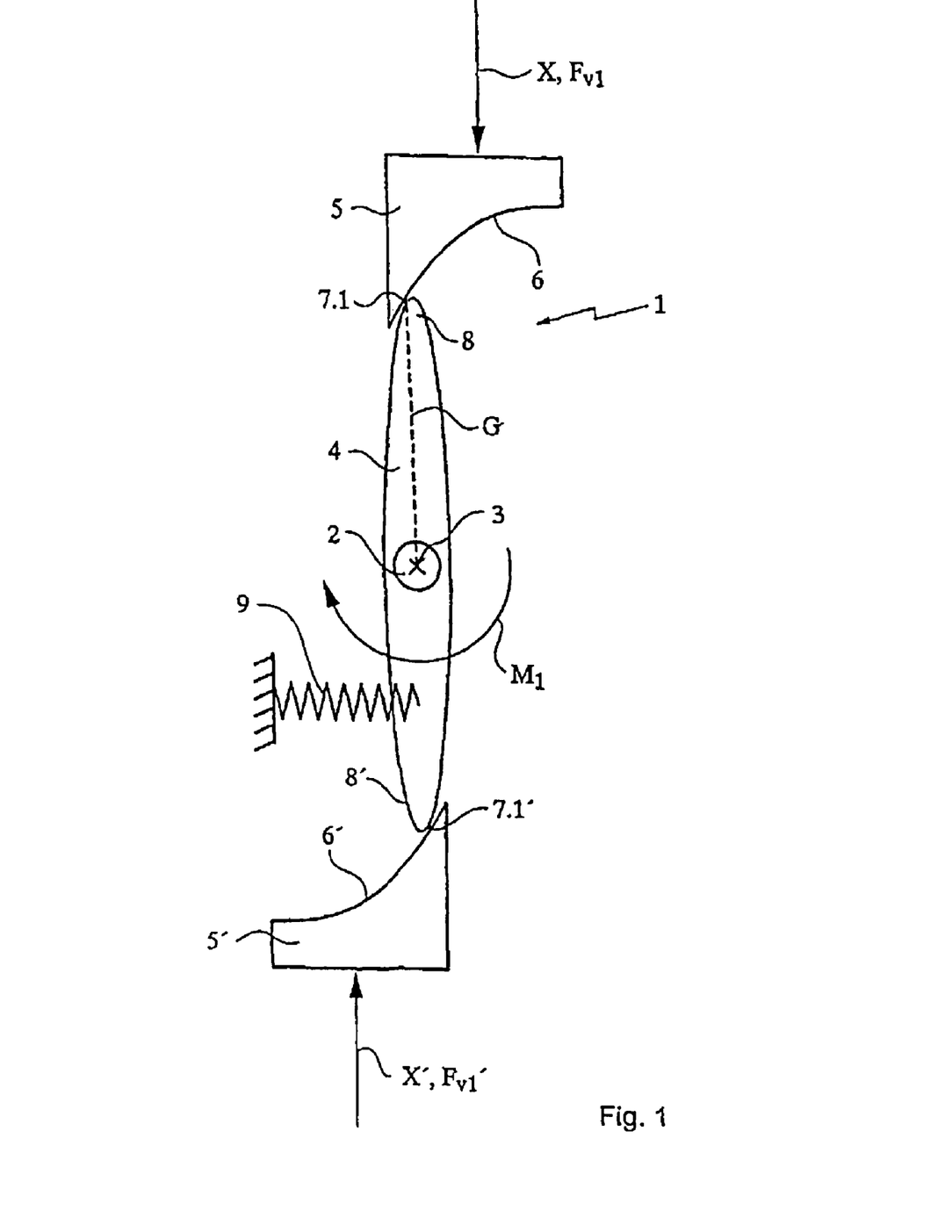
FIG. 1 is a schematic representation of a transmission device according to an exemplary embodiment shown in a first rotational position.
Figure 2:
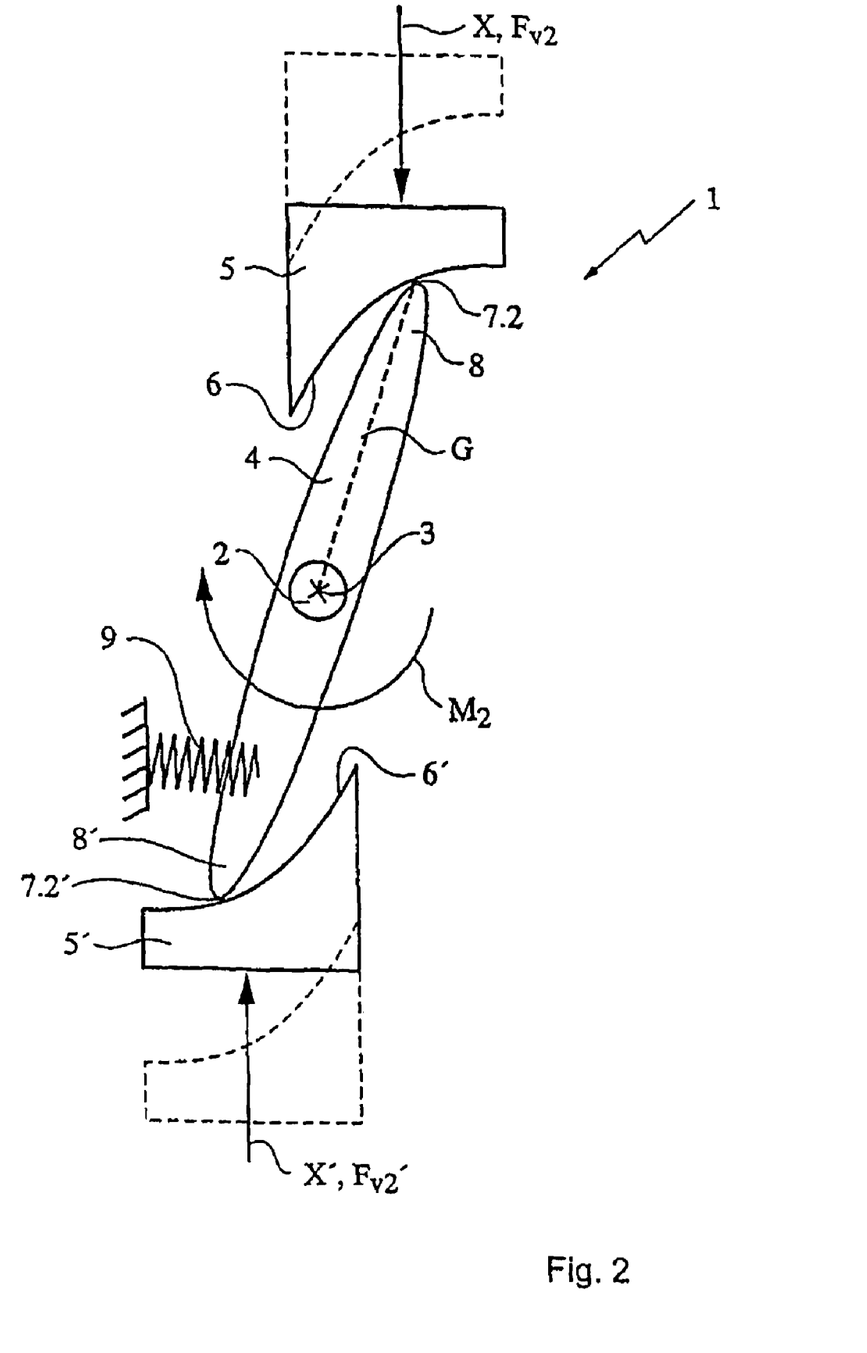
FIG. 2 is a schematic representation of the transmission device of FIG. 1 shown in a second rotational position.

Referring to FIGS. 1 and 2, a transmission device 1 is shown according to an exemplary embodiment. The transmission device 1 comprises a driven shaft 2 and two diametrically arranged straight levers 4, 4'. The driven shaft 2 can rotate about an axis of rotation 3. The levers 4, 4' extend radially from the driven shaft 2 and are rotationally locked to the driven shaft 2.

The transmission device 1 further comprises two slide elements 5, 5' situated opposite one another in relation to the axis of rotation 3. The sides of the two slide elements 5, 5' are inclined surfaces and face the axis of rotation 3. According to an exemplary embodiment, the sides of the two slide elements 5, 5' are in the form of arched inclined faces 6, 6'. As noted above, for purposes of the present disclosure, the term "arched" is used broadly to refer to not only curved contours but also polygonal contours. At a point of action 7.1, 7.1', each inclined face 6, 6' interacts with a radially outer end 8, 8' of a lever 4, 4'.

Figure 1A:
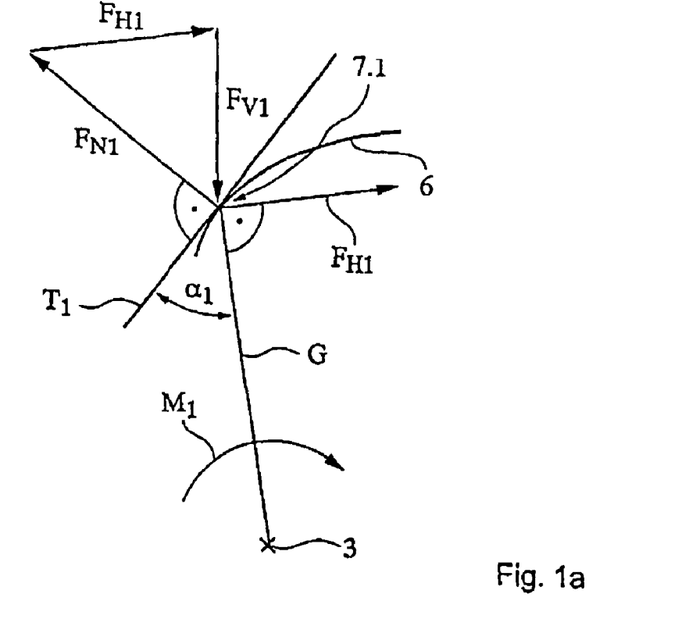
FIG. 1a is a schematic representation of the forces acting on the transmission device of FIG. 1 when the transmission device is in the first rotational position.

With reference to FIG. 1a, the force FV1 exerted in the direction of displacement by the inclined face 6 gives rise to a normal force FN1 and consequently to a force FH1 on the end 8 of the lever 4 (and likewise on the opposite end 8'), which force is directed perpendicular to a straight line G connecting the point of action 7.1 and the axis of rotation 3 and in conjunction with the lever 4 generates the torque M1. The magnitude of the force FH1 varies as a function of the inclination α1 of the tangent T1 running through the point of action 7.1. In the rotational position shown in FIGS. 1 and 1a, the inclination α1 of the tangent T1 is relatively slight, so that under a predefined displacement force F1 a large force FH1 and therefore a high torque M1 is generated on the driven shaft 2. The rotational speed here is naturally low.

In a linear displacement of the sliding elements 5, 5' in the direction of the axis of rotation 3, the point of action 7.2, 7.2' migrates on the inclined faces 6, 6', as shown in FIG. 2. The directions X, X' of the displacements need not necessarily lead through the axis of rotation 3, but may among other things run parallel to one another past the axis of rotation, as in the exemplary embodiment.

Figure 2A:
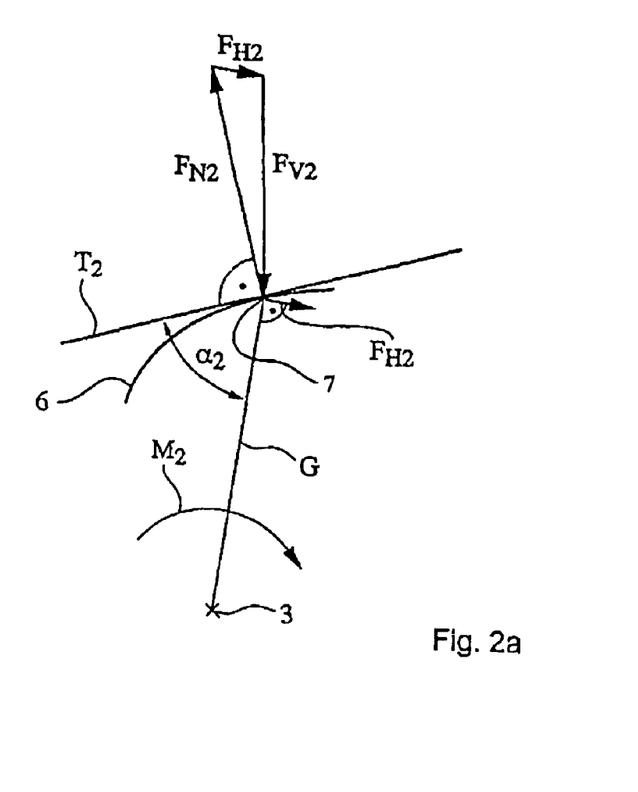
FIG. 2a is a schematic representation of the forces acting on the transmission device of FIG. 1 when the transmission device is in the second rotational position.

The arched contour of the inclined faces 6, 6' is designed so that the inclination a increases during the shifting of the point of action 7.2, 7.2' and compared to a1 assumes the higher value α2 at the point according to FIG. 2 and 2a. Under a constant displacement force FV, the normal force FN2 and the force FH2 acting on the end 8 of the lever 4 consequently diminish. Similarly, the torque M2 diminishes, while the rotational speed increases.

Under a constant displacement force FV and at a constant rate of displacement of the sliding elements 5, 5' about the axis of rotation 3, the transmission device produces a rotational movement with steadily falling torque M and increasing rotational speed. The initially high torque M1 may be used to overcome breakaway torques, and the subsequently increasing rotational speed for rapid adjustment.

With the sliding elements 5, 5' now moving apart, the lever 4 is returned into its starting position by a return spring 9, which has been pre-tensioned under the preceding rotational movement.

Figure 3:
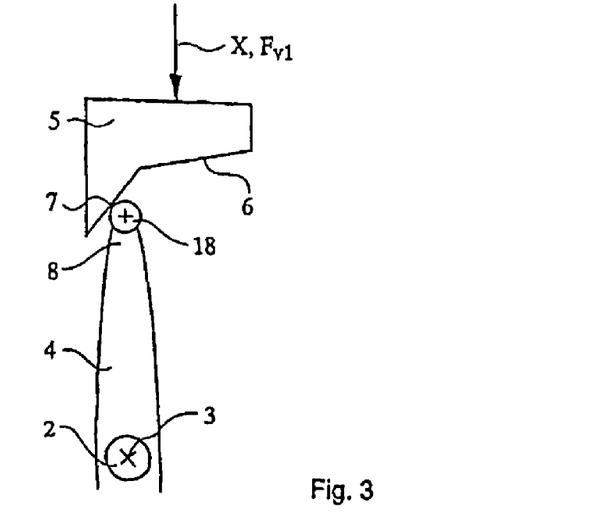
FIG. 3 is a partial schematic representation of a transmission device according to another exemplary embodiment.

Should abrupt variations in the torque M and the rotational speed be desirable in specific positions of the transmission device 1, the inclined face 6 may also be of polygonal design, as shown in FIG. 3. A rolling element 18 arranged at the end 8 of the lever 4 in this case reduces the frictional forces at the point of action 7.

Figure 4:
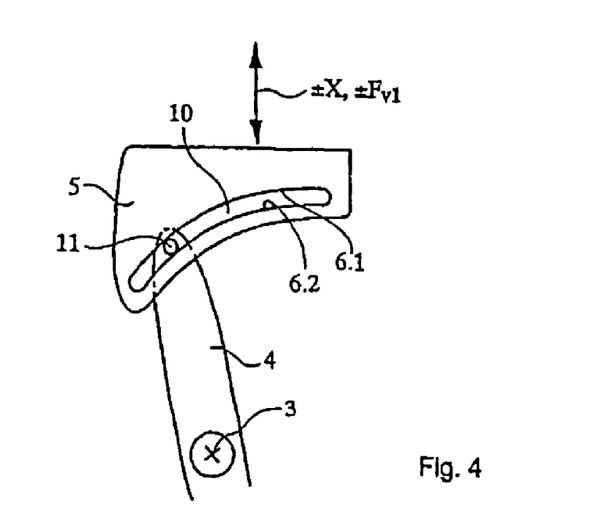
FIG. 4 is a partial schematic representation of a transmission device according to another exemplary embodiment.
Figure 4A:
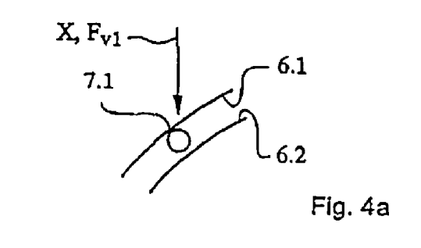
FIG. 4a is a detailed view of the transmission device of FIG. 4.
Figure 4B:
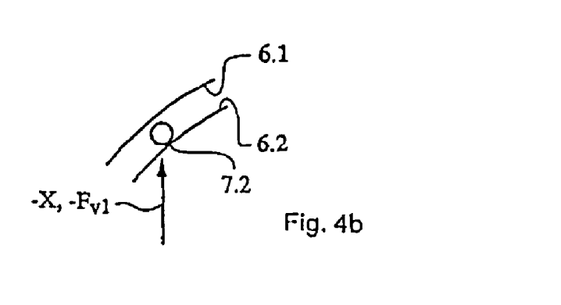
FIG. 4b is another detailed view of the transmission device of FIG. 4.

According to the exemplary embodiment illustrated in FIG. 4, the sliding element 5 is equipped with an arched link 10 having an upper inclined face 6.1 and a lower inclined face 6.2 equidistant therefrom. Running in the link 10 is a pin 11, which at the end projects from the lever 4 and which as the sliding element 5 is displaced in the direction of the axis of rotation 3 rests at the point of action 7.1 on the upper inclined face 6.1, but in the event of displacement in the opposite direction rests at the point of action 7.2 on the lower inclined face 6.2 (see FIG. 4a, 4b). A transmission device acting in both directions of rotation can therefore be created without using a return spring 9.

Figure 5:
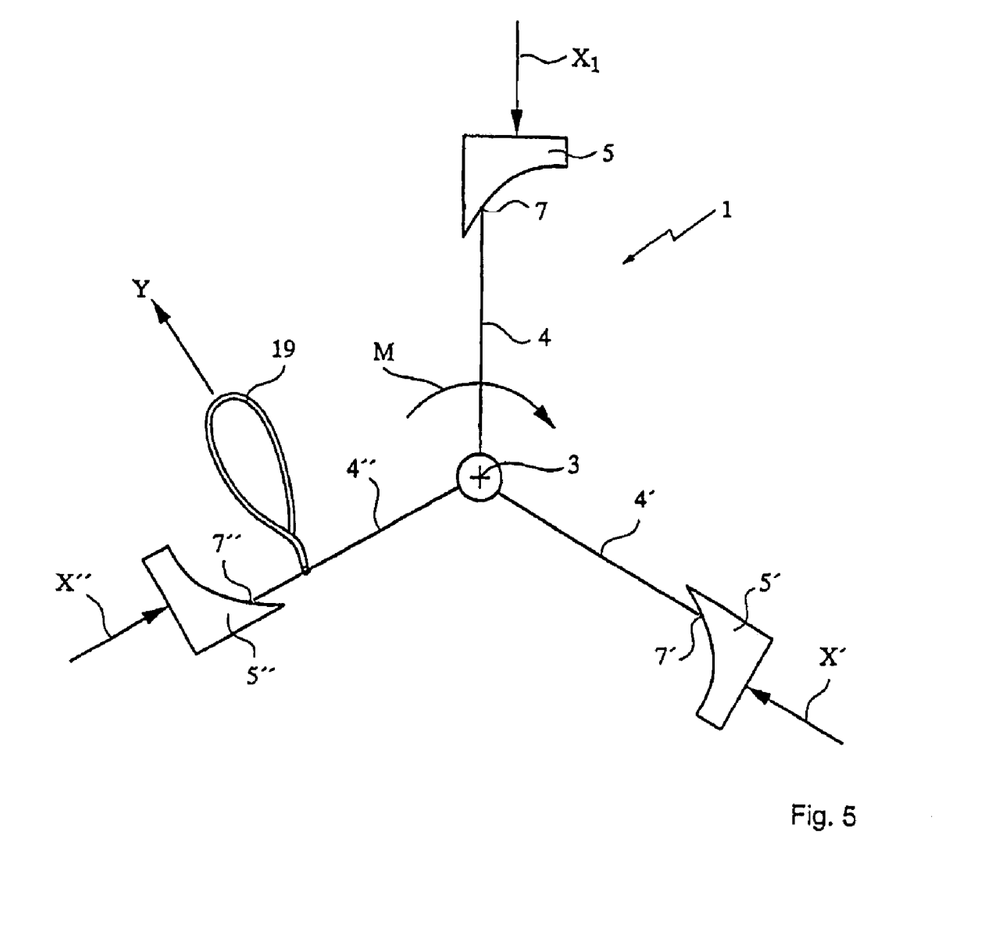
FIG. 5 is a schematic representation of a transmission device according to another exemplary embodiment.

FIG. 5 shows a transmission device 1 according to another exemplary embodiment. The transmission device 1 illustrated in FIG. 5 comprises three levers 4, 4' and 4" rigidly connected to one another and rotatable together about the axis of rotation 3. Each of the three levers 4, 4' and 4" has an associated sliding element 5, 5' and 5". According to the various alternative embodiments, the transmission device 1 may have any of a number of configurations in which the levers 4 are arranged asymmetrically in relation to one another or in some other number. According to further alternative embodiments, the sliding element 5" may be manually operable so that in the event of a failure of electrically driven sliding elements 5 and 5', actuation can still be performed in the direction of the torque M. For example, to facilitate manual operation, the transmission device 1 may include a manual control (e.g., a grab loop 19 that can be pulled in direction Y) acting (e.g., directly, etc.) on one of the levers 4 to 4".

Figure 6:
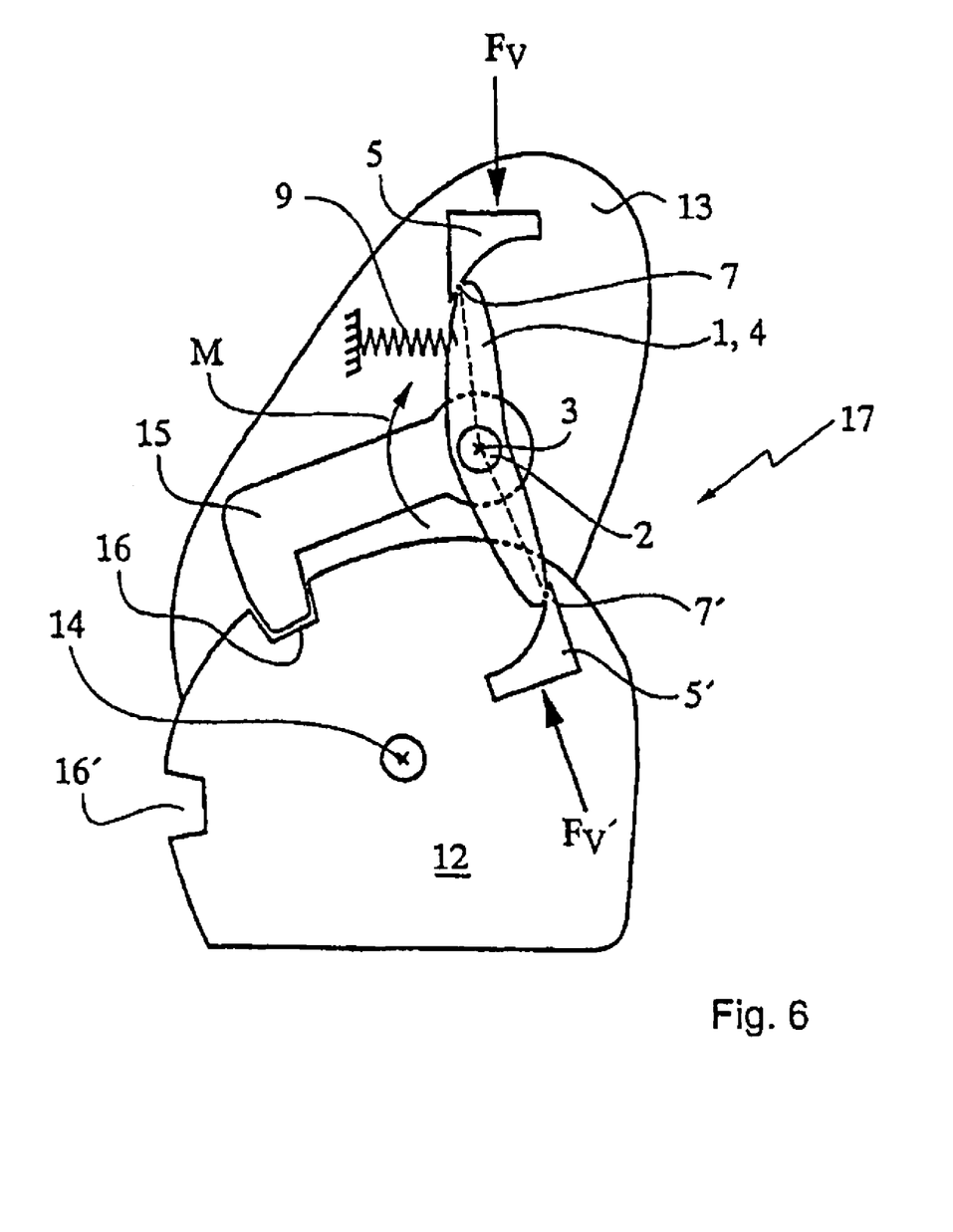
FIG. 6 is a seat adjuster equipped with a transmission device according to an exemplary embodiment.

Referring to FIG. 6, one exemplary embodiment of the transmission device 1 is shown as being used in combination with a ratchet-type adjuster 17 for a vehicle seat. In such an application, the transmission device 1 is used to generate a torque M for releasing the ratchet-type adjuster 17. According to an exemplary embodiment, the ratchet-type adjuster 17 comprises a first fitting 12 fixed to a seat part (not shown) and a second fitting 13 arranged on a backrest (not shown). The first fitting 12 and the second fitting 13 are rotatable in relation to one another about an axis 14, which at the same time constitutes the pivot axis of the seat part and the backrest. A latch 15 rotatably arranged on the second fitting 13 in the area of the axis 3 can engage alternatively in either one of the recesses 16, 16' let into the outer circumference of the first fitting 12, thereby fixing the angular position of the backrest. The latch 15 is rotationally locked on the driven shaft 2 of the transmission device 1 and can be raised out of the recesses 16, 16', initially with a high release force and subsequently with a high release speed.

The invention claimed is:

1. A transmission device for a vehicle seat adjuster configured to adjust the inclination of a backrest of a vehicle seat, the transmission device comprising:
   at least a first lever and a second lever extending radially from a shaft defining a first axis and connected thereto, the first and second levers each having a free end and configured to provide a rotary output motion;
   a latch rotationally locked on the shaft; and
   at least a first inclined face and a second inclined face situated substantially opposite to one another relative to the first axis and movable in substantially opposite directions toward the first axis in a substantially linear manner, the first and second inclined faces each including one of a curvilinear and a polygonal portion,
   wherein the free ends of the first and second levers engage the first and second inclined faces at a point of action and move back and forth in a reciprocal manner along the first and second inclined faces respectively for translating the linear movement of the first and second inclined faces into the rotary output motion,
   wherein an inclination of the first and second inclined faces varies such that the inclination at the point of action increases as the first and second inclined faces move toward the first axis, the inclination being measured relative to an imaginary straight line connecting the first axis and the point of action, and
   wherein the latch is configured to limit the movement of the first and second levers.

2. The transmission device of claim 1, wherein the inclination of each of the first and second inclined faces is between 0 degrees and 90 degrees.

3. The transmission device of claim 1, wherein the action between the first and second levers and the first and second inclined faces operate through sliding friction.

4. The transmission device of claim 1, wherein the action between the first and second levers and the first and second inclined rolling friction.

5. The transmission device of claim 1, wherein the first and second levers are coplanar.

6. The transmission device of claim 5, wherein the first lever is diametrically opposite the second lever.

7. The transmission device of claim 1, wherein the first and second inclined faces are each part of a link guide moveable in the direction towards the first axis and counter thereto so that both a linear motion of the first and second inclined faces toward the first axis and an opposing linear motion away from the first axis can be used to generate an alternating torque.

8. An adjuster for a vehicle seat having a transmission device as claimed in claim 1.

9. The transmission device of claim 1, wherein the rotary output motion is configured to have a torque that decreases as the first and second inclined faces move toward the first axis.

10. The transmission device of claim 1, wherein the rotary output motion is configured to have a speed that increases as the first and second inclined faces move toward the first axis.

11. The transmission device of claim 1, further comprising a spring configured to return the first and second levers to an initial position, the initial position being in a direction that moves the first and second inclined faces away from the first axis.

12. A seat adjuster for adjusting the inclination of a backrest of a vehicle seat, the seat adjuster comprising:
   a first fitting configured to be fixed relative to a seat base part;
   a second fitting rotatably coupled to the first fitting at a first axis and configured to be fixed relative to a seat backrest;
   a latch rotatably coupled to one of the first fitting and the second fitting at a second axis and having a free end configured to releasably engage the other one of the first fitting and the second fitting; and
   a transmission device supported at one of the first fitting and the second fitting, the transmission device comprising:
      at least a first lever and a second lever extending radially from a shaft defining the second axis and connected thereto, the first and second levers each having a free end and configured to provide a rotary output motion; and
      at least a first inclined face and a second inclined face situated substantially opposite to one another relative to the second axis and movable in substantially opposite directions toward the second axis in a substantially linear manner, the first and second inclined faces each including one of a curvilinear and a polygonal portion,
   wherein the free ends of the first and second levers engage the first and second inclined faces at a point of action and move back and forth in a reciprocal manner along the first and second inclined faces respectively for translating the linear movement of the first and second inclined faces into the rotary output motion to generate a torque for selectively disengaging the free end of the latch,
   wherein an inclination of the first and second inclined faces varies such that the inclination at the point of action increases as the first and second inclined faces move toward the second axis, the inclination being measured relative to an imaginary straight line connecting the first axis and the point of action, and
   wherein the latch is rotationally locked to the shaft and configured to limit the movement of the first and second levers.

13. The seat adjuster of claim 12, wherein the inclination of each of the first and second inclined faces is between 0 degrees and 90 degrees.

14. The seat adjuster of claim 12, wherein the action between the first and second levers and the first and second inclined faces operate through sliding friction.

15. The seat adjuster of claim 12, wherein the action between the first and second levers and the first and second inclined faces operate through rolling friction.

16. The seat adjuster of claim 12, wherein the torque of the rotary output motion is configured to decrease as the first and second inclined faces move toward the second axis.

17. The seat adjuster of claim 12, wherein the rotary output motion is configured to have a speed that increases as the first and second inclined faces move toward the second axis.

18. The seat adjuster of claim 12, wherein the transmission device further comprises a spring configured to return the first and second levers to an initial position, the initial position being in a direction that moves the first and second inclined faces away from the second axis.

19. A method of converting linear motion into rotary motion within a transmission device for a seat adjuster, the method comprising:
providing at least a first lever and a second lever extending radially from a shaft defining a first axis, the first and second levers having free ends;
providing a latch that is rotationally locked on the shaft;
providing at least a first inclined surface and second inclined surface situated substantially opposite to one another relative to the first axis and movable in a substantially linear manner in substantially opposite directions toward the first axis;
positioning the first and second inclined surfaces so that the first and second inclined surface interact with the free ends of the respective first and second levers at a point of action, the free ends of the first and second levers being configured to move back and forth in a reciprocal manner along the respective first and second inclined surfaces; and
varying an inclination of the first and second surfaces such that the inclination at the point of action increases as the first and second inclined faces move toward the first axis, the inclination being measured relative to an imaginary straight line connecting the first axis and the point of action,
wherein the interaction between the first and second inclined surfaces and the free of the respective first and second levers converts the linear movement of the first and second inclined surfaces into a rotary output motion,
wherein the latch is configured to limit the movement of the first and second levers.

20. The transmission device of claim 19, further comprising biasing the first and second levers toward an initial position, the initial position being in a direction that moves the first and second inclined surfaces away from the first axis.

* * * * *